(12) United States Patent
Park et al.

(10) Patent No.: US 12,418,623 B2
(45) Date of Patent: Sep. 16, 2025

(54) METHOD OF INSPECTING IMAGE QUALITY, IMAGE QUALITY INSPECTION SYSTEM PERFORMING THE SAME, AND DISPLAY DEVICE TO WHICH THE SAME IS APPLIED

(71) Applicant: Samsung Display Co., LTD., Yongin-si (KR)

(72) Inventors: Sunyoung Park, Yongin-si (KR); Kyongtae Park, Yongin-si (KR); Youngnam Yun, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 52 days.

(21) Appl. No.: 18/425,416

(22) Filed: Jan. 29, 2024

(65) Prior Publication Data

US 2024/0275907 A1    Aug. 15, 2024

(30) Foreign Application Priority Data

Feb. 9, 2023   (KR) .................. 10-2023-0017653

(51) Int. Cl.
*H04N 5/21*   (2006.01)
*G06T 5/60*   (2024.01)
*G06T 5/70*   (2024.01)

(52) U.S. Cl.
CPC ............... *H04N 5/21* (2013.01); *G06T 5/60* (2024.01); *G06T 5/70* (2024.01)

(58) Field of Classification Search
CPC ............... H04N 5/21; G06T 5/60; G06T 5/70
See application file for complete search history.

(56) References Cited

U.S. PATENT DOCUMENTS 4,439,157 A * 3/1984 Breglia ............... G02B 27/0172
                                                          359/618
6,543,899 B2 * 4/2003 Covannon ............ G02B 27/017
                                                          353/11

(Continued)

FOREIGN PATENT DOCUMENTS

KR    1020200084419 A    7/2020
KR       102224260 B1    3/2021
KR       102337745 B1   12/2021

OTHER PUBLICATIONS

Olaf Ronneberger et al., U-Net: Convolutional Networks for Biomedical Image Segmentation, Computer Vision and Pattern Recognition, May 18, 2015, pp. 1-8.

(Continued)

*Primary Examiner* — Michael B. Pierorazio
(74) *Attorney, Agent, or Firm* — CANTOR COLBURN LLP

(57) ABSTRACT

A method of inspecting image quality includes receiving a non-moire image generated by a simulator and a moire image generated by the simulator based on the non-moire image, training a moire removal deep learning model for converting the moire image into the non-moire image, from which a moire is removed, using the non-moire image and the moire image, inputting an evaluation image generated by capturing an image displayed on a first display region by an imaging device into the moire removal deep learning model, and removing the moire from the evaluation image through the moire removal deep learning model when the evaluation image includes the moire.

20 Claims, 15 Drawing Sheets

(56) References Cited

U.S. PATENT DOCUMENTS

| | | | | |
|---|---|---|---|---|
| 6,652,104 B2* | 11/2003 | Nishida | | H04N 9/3185 353/69 |
| 6,877,863 B2* | 4/2005 | Wood | | H04N 9/3185 353/42 |
| 7,070,283 B2* | 7/2006 | Akutsu | | H04N 5/74 353/30 |
| 7,119,965 B1* | 10/2006 | Rolland | | G02B 27/0172 359/630 |
| 7,182,466 B2* | 2/2007 | Sunaga | | H04N 5/74 353/69 |
| 7,270,421 B2* | 9/2007 | Shinozaki | | G03B 21/142 353/121 |
| 7,359,575 B2* | 4/2008 | Bassi | | G06T 3/18 345/427 |
| 7,441,906 B1* | 10/2008 | Wang | | G03B 21/14 353/121 |
| 7,782,387 B2* | 8/2010 | Azuma | | H04N 25/68 359/662 |
| 8,676,427 B1* | 3/2014 | Ferguson | | G08G 1/0965 701/23 |
| 9,753,126 B2* | 9/2017 | Smits | | G01S 17/003 |
| 9,810,913 B2* | 11/2017 | Smits | | G02B 5/124 |
| 10,067,230 B2* | 9/2018 | Smits | | G01S 17/86 |
| 10,261,183 B2* | 4/2019 | Smits | | G01S 7/4868 |
| 10,379,220 B1* | 8/2019 | Smits | | G01S 7/4811 |
| 10,394,112 B2* | 8/2019 | Johnson | | A01M 1/223 |
| 10,473,921 B2* | 11/2019 | Smits | | G01S 17/87 |
| 10,591,605 B2* | 3/2020 | Smits | | G01S 17/42 |
| 10,663,626 B2* | 5/2020 | Benitez | | G02B 27/01 |
| 11,830,455 B2* | 11/2023 | Schriever | | G06F 3/16 |
| 11,913,889 B2* | 2/2024 | Maruyama | | G06T 7/248 |
| 2002/0051095 A1* | 5/2002 | Su | | H04N 9/3194 348/745 |
| 2002/0067466 A1* | 6/2002 | Covannon | | G02B 30/26 353/8 |
| 2002/0122161 A1* | 9/2002 | Nishida | | H04N 9/3194 353/70 |
| 2003/0191836 A1* | 10/2003 | Murtha | | H04L 67/02 709/224 |
| 2003/0210381 A1* | 11/2003 | Itaki | | H04N 5/74 353/70 |
| 2004/0156024 A1* | 8/2004 | Matsuda | | H04N 9/3185 353/70 |
| 2005/0046803 A1* | 3/2005 | Akutsu | | H04N 5/74 353/69 |
| 2005/0073661 A1* | 4/2005 | Tamura | | H04N 9/3194 353/70 |
| 2005/0151934 A1* | 7/2005 | Akutsu | | G03B 21/147 353/69 |
| 2005/0237492 A1* | 10/2005 | Shinozaki | | H04N 9/3185 353/69 |
| 2006/0098167 A1* | 5/2006 | Sato | | G03B 21/26 353/35 |
| 2006/0203207 A1* | 9/2006 | Ikeda | | H04N 9/3185 353/70 |
| 2007/0008344 A1* | 1/2007 | Medina | | G06T 15/10 345/647 |
| 2007/0257941 A1* | 11/2007 | Plut | | G06F 9/451 345/660 |
| 2007/0285626 A1* | 12/2007 | Miyasaka | | G03B 21/206 353/85 |
| 2009/0278999 A1* | 11/2009 | Ofune | | H04N 21/47 348/E3.048 |
| 2010/0002123 A1* | 1/2010 | Nozaki | | H04N 23/00 348/E5.022 |
| 2010/0045942 A1* | 2/2010 | Furui | | H04N 9/3194 353/69 |
| 2011/0085044 A1* | 4/2011 | Noda | | G03B 21/58 348/E5.133 |
| 2011/0210979 A1* | 9/2011 | Furui | | G03B 37/04 345/619 |
| 2011/0234994 A1* | 9/2011 | Uchiyama | | H04N 9/3185 353/121 |
| 2011/0285971 A1* | 11/2011 | Oka | | H04N 9/3185 353/70 |
| 2013/0245877 A1* | 9/2013 | Ferguson | | G05D 1/0246 701/23 |
| 2014/0303827 A1* | 10/2014 | Dolgov | | B60W 30/00 701/23 |
| 2015/0094897 A1* | 4/2015 | Cuddihy | | B60K 35/81 701/23 |
| 2015/0336502 A1* | 11/2015 | Hillis | | G05D 1/0088 701/23 |
| 2017/0240096 A1* | 8/2017 | Ross | | G05D 1/0212 |
| 2018/0158102 A1* | 6/2018 | Choi | | G06Q 30/0251 |
| 2020/0174130 A1* | 6/2020 | Banerjee | | B60R 11/04 |
| 2021/0004610 A1* | 1/2021 | Huang | | G01S 17/10 |
| 2021/0310823 A1* | 10/2021 | Wilbers | | G01C 21/3811 |
| 2021/0341310 A1* | 11/2021 | Wilbers | | G01C 21/26 |
| 2022/0039874 A1* | 2/2022 | Choi | | A61B 90/37 |
| 2022/0171412 A1* | 6/2022 | Cui | | G08B 3/10 |
| 2022/0201262 A1* | 6/2022 | Chen | | H04N 9/3185 |
| 2022/0242430 A1* | 8/2022 | Watano | | B60W 50/10 |
| 2023/0010713 A1* | 1/2023 | Park | | G01S 17/88 |
| 2023/0164283 A1* | 5/2023 | Hase | | H04N 1/405 |
| 2023/0377197 A1* | 11/2023 | Napolskikh | | G01C 11/06 |
| 2024/0062696 A1* | 2/2024 | Liu | | G09G 3/2007 |
| 2024/0185382 A1* | 6/2024 | Kang | | G06T 7/0002 |

OTHER PUBLICATIONS

Sun, et al., "Moiré Photo Restoration Using MultiresolutionConvolutional Neural Networks", IEEE Transactions on Image Processing, vol. 27, No. 8, Aug. 2018.

* cited by examiner

100  IMAGE SENSOR

METHOD OF INSPECTING IMAGE QUALITY, IMAGE QUALITY INSPECTION SYSTEM PERFORMING THE SAME, AND DISPLAY DEVICE TO WHICH THE SAME IS APPLIED

This application claims priority to Korean Patent Application No. 10-2023-0017653, filed on Feb. 9, 2023, and all the benefits accruing therefrom under 35 U.S.C. § 119, the content of which in its entirety is herein incorporated by reference.

BACKGROUND

1. Field

Embodiments of the invention relate to a method of inspecting image quality, an image quality inspection system performing the method, and a display device to which the method is applied. More particularly, embodiments of the invention relate to a method of inspecting image quality, an image quality inspection system performing the method, and a display device to which the same is applied for removing a moire from an image captured in a under panel camera (UPC) region.

2. Description of the Related Art

Generally, an imaging device may be used to inspect quality of an image displayed on a display panel. However, when the image displayed on the display panel is captured by the imaging device, a pattern called a moire may occur in the image.

Since an image sensor included in the imaging device includes imaging pixels arranged in a lattice structure, high frequency components may cause interference when an object having a specific pattern is captured. Therefore, the moire may occur depending on an arrangement of pixels included in the display panel and an arrangement of the imaging pixels included in the image sensor of the imaging device.

SUMMARY

When a captured image captured by an image sensor of an imaging device used to inspect quality of an image displayed on a display panel includes a moire, the image displayed on the display panel and the image captured through the image sensor of the imaging device may be different from each other. Therefore, when inspection of image quality is performed on the image including the moire, reliability of the inspection may be low.

Embodiments of the invention provide a method of inspecting image quality for removing a moire using a simulator and a deep learning model.

Embodiments of the invention provide an image quality inspection system for the method of inspecting the image quality.

Embodiments of the invention provide a display device to which the method of inspecting the image quality is applied.

In an embodiment of a method of inspecting image quality according to the invention, the method includes receiving a non-moire image generated by a simulator and a moire image generated by the simulator based on the non-moire image, training a moire removal deep learning model for converting the moire image into the non-moire image, from which a moire is removed, using the non-moire image and the moire image, inputting an evaluation image generated by capturing an image displayed on a first display region by an imaging device into the moire removal deep learning model, and removing the moire from the evaluation image through the moire removal deep learning model when the evaluation image includes the moire.

In an embodiment, the simulator may generate the moire image based on an arrangement of first pixels included in a display panel and an arrangement of second pixels included in an image sensor of the imaging device.

In an embodiment, the simulator may generate the moire image by adjusting at least one selected from an angle of the display panel and an angle of the image sensor.

In an embodiment, the simulator may generate the moire image by adjusting at least one selected from a magnification of the display panel and a magnification of the image sensor.

In an embodiment, the moire image may be generated by overlapping a reference-moire image on the non-moire image.

In an embodiment, a difference between a luminance of the moire image and a luminance of the non-moire image may be less than or equal to a moire range value.

In an embodiment, the moire removal deep learning model may be trained through supervised learning of converting the moire image into the non-moire image by dividing the moire image and the reference-moire image.

In an embodiment, the first display region may include a display portion and a transmitting portion, and the first display region overlaps a camera module.

In an embodiment, the moire removal deep learning model may be a U-NET network.

In an embodiment of an image quality inspection system according to the invention, the image quality inspection system includes an imaging device which captures an evaluation image displayed on a first display region, a simulator which generates a non-moire image and to generate a moire image based on the non-moire image, a moire eliminator which trains a moire removal deep learning model for converting the moire image into the non-moire image, from which a moire is removed, using the non-moire image and the moire image, and removes the moire from the evaluation image through the moire removal deep learning model when the evaluation image includes the moire, and an inspector which generates compensation data based on the evaluation image, from which the moire is removed.

In an embodiment, the simulator may be which generate the moire image based on an arrangement of first pixels included in a display panel and an arrangement of second pixels included in an image sensor of the imaging device.

In an embodiment, the simulator may be which generate the moire image by adjusting at least one selected from an angle of the display panel and an angle of the image sensor.

In an embodiment, the simulator may generate the moire image by adjusting at least one selected from a magnification of the display panel and a magnification of the image sensor.

In an embodiment, the moire image may be generated by overlapping a reference-moire image on the non-moire image.

In an embodiment, a difference between a luminance of the moire image and a luminance of the non-moire image may be less than or equal to a moire range value.

In an embodiment, the moire eliminator may train the moire removal deep learning model through supervised learning of converting the moire image into the non-moire image by dividing the moire image and the reference-moire image.

In an embodiment, the first display region may include a display portion and a transmitting portion, and the first display region overlaps a camera module.

In an embodiment, the moire removal deep learning model may be a U-NET network.

In an embodiment of a display device according to the invention, the display device comprises a display panel including first pixels, a gate driver which provides a gate signal to each of the first pixels, a compensation data memory which stores compensation data, a driving controller which compensates for input image data to generate compensated image data based on the compensation data, and a data driver which provides a data voltage based on the compensated image data to each of the first pixels. In such an embodiment, the compensation data includes a compensation value determined based on a moire removal deep learning model trained using a non-moire image generated by a simulator and a moire image generated by the simulator based on the non-moire image.

In an embodiment, the simulator may generate the moire image based on an arrangement of the first pixels included in the display panel and an arrangement of second pixels included in an image sensor of an imaging device.

In the method of inspecting the image quality, the image quality inspection system, and the display device according to embodiments of the invention, the non-moire image and the moire image based on the non-moire image may be generated by the simulator, the moire removal deep learning model which converts the moire image into the non-moire image, from which the moire is removed, may be trained by using images generated by the simulator. Accordingly, a time spent for generating the non-moire image and the moire image which are used for training the moire removal deep learning model may be reduced, and the moire of the evaluation image may be removed, so that reliability of the inspection may be enhanced.

BRIEF DESCRIPTION OF THE DRAWINGS

The above and other features of embodiments of the invention will become more apparent by describing in detailed embodiments thereof with reference to the accompanying drawings, in which.

DETAILED DESCRIPTION

Figure 1:
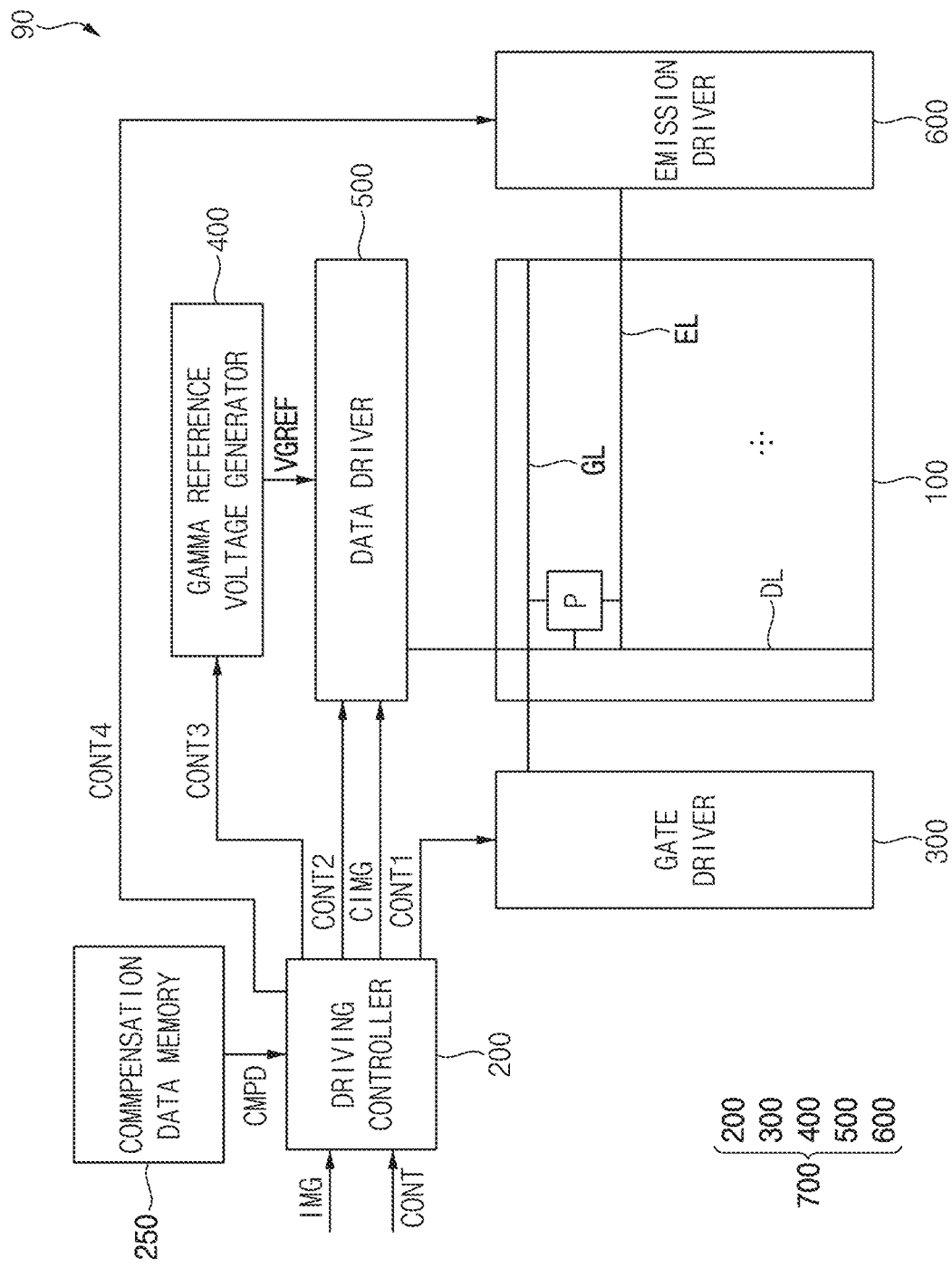
FIG. 1 is a block diagram for illustrating a display device according to embodiments.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, embodiments of the invention will be described in detail with reference to the accompanying drawings.

FIG. 1 is a block diagram for illustrating a display device 90 according to embodiments.

Referring to FIG. 1, an embodiment of a display device 90 may include a display panel 100 and a display panel driver 700. The display panel driver 700 may include a driving controller 200, a gate driver 300, a gamma reference voltage generator 400, a data driver 500, and an emission driver 600. The display panel driver 700 may further include a compensation data memory 250.

In an embodiment, for example, the driving controller 200 and the data driver 500 may be integrally formed as a single chip. In an embodiment, for example, the driving controller 200, the gamma reference voltage generator 400, and the data driver 500 may be integrally formed as a single unitary part (e.g., a single chip). In an embodiment, for example, the driving controller 200, the gate driver 300, the gamma reference voltage generator 400, and the data driver 500 may be integrally formed as a single unitary part. In an embodiment, for example, the driving controller 200, the gate driver 300, the gamma reference voltage generator 400, the data driver 500, and the emission driver 600 may be integrally formed as a single unitary part. A driving module including at least the driving controller 200 and the data driver 500 which are integrally formed as a single unitary part may be referred to as a timing controller embedded data driver (TED).

In an embodiment, for example, the display panel 100 may be an organic light emitting diode display panel including organic light emitting diodes. In an embodiment, for example, the display panel 100 may be a quantum-dot organic light emitting diode display panel including organic light emitting diodes and quantum-dot color filters. In an embodiment, for example, the display panel 100 may be a quantum-dot nano light emitting diode display panel including nano light emitting diodes and quantum-dot color filters.

The display panel 100 may include gate lines GL, data lines DL, emission lines EL, and pixels P electrically connected to the gate lines GL, the data lines DL, and the emission lines EL.

The driving controller 200 may receive input image data IMG and an input control signal CONT from an external device. In an embodiment, for example, the input image data IMG may include red image data, green image data, and blue image data. The input image data IMG may further include white image data. Alternatively, the input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, and a compensated image data CIMG based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the compensated image data CIMG based on the input image data IMG. The driving controller 200 may output the compensated image data CIMG to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the emission driver 600 based on the input control signal CONT, and output the third control signal CONT4 to the emission driver 600.

The compensation data memory 250 may store compensation data CMPD having compensation values determined based on a moire removal deep learning model generated by performing deep learning.

The gate driver 300 may generate gate signals for driving the gate lines GL in response to the first control signal CONT1 received from the driving controller 200. The gate driver 300 may output the gate signals to the gate lines GL.

In an embodiment, the gate driver 300 may be integrated on a peripheral region of the display panel 100.

The gamma reference voltage generator 400 may generate a gamma reference voltage VGREF in response to the third control signal CONT3 received from the driving controller

200. The gamma reference voltage generator 400 may provide the gamma reference voltage VGREF to the data driver 500. The gamma reference voltage VGREF may have a value corresponding to each compensated image data CIMG.

In an embodiment, the gamma reference voltage generator 400 may be disposed in the driving controller 200 or in the data driver 500.

The data driver 500 may receive the second control signal CONT2 and the compensated image data CIMG from the driving controller 200, and receive the gamma reference voltage VGREF from the gamma reference voltage generator 400. The data driver 500 may convert the compensated image data CIMG into a data voltage in analog form using the gamma reference voltage VGREF. The data driver 500 may output the data voltage to the data line DL.

The emission driver 600 may generate emission signals for driving the emission lines EL in response to the fourth control signal CONT4 received from the driving controller 200. The emission driver 600 may output the emission signals to the emission lines EL.

FIG. 1 shows an embodiment where the gate driver 300 is disposed on a first side of the display panel 100 and the emission driver 600 is disposed on a second side of the display panel 100 for convenience of description. The invention is not limited to this. In an alternative embodiment, for example, both the gate driver 300 and the emission driver 600 may be disposed on the first side of the display panel 100. In an embodiment, for example, the gate driver 300 and the emission driver 600 may be integrally formed as a single unitary part.

Figure 2:
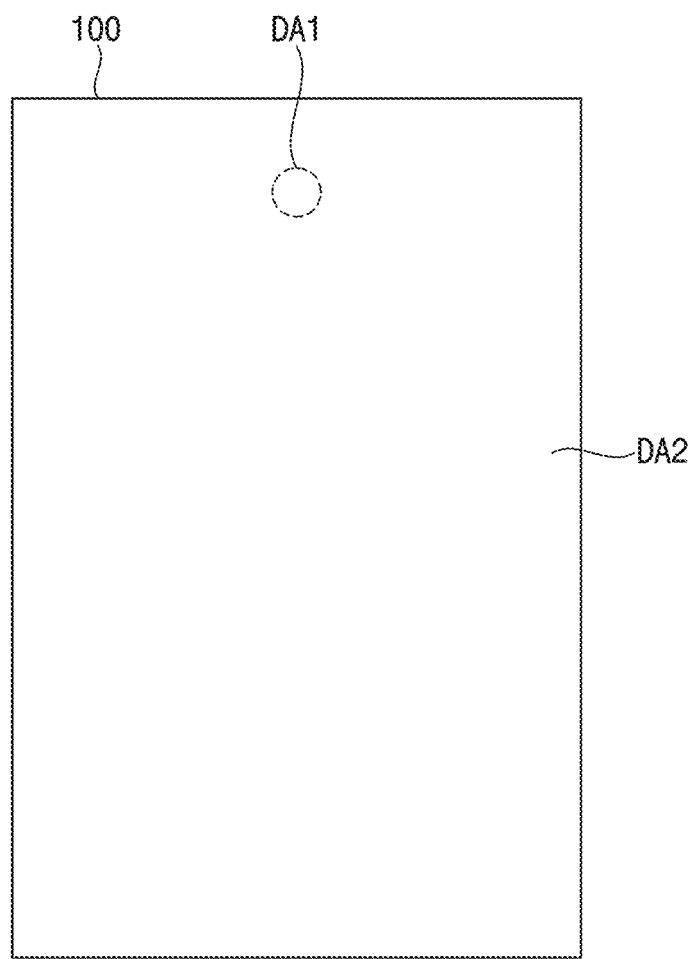
FIG. 2 is a diagram for illustrating a display panel in FIG. 1.
Figure 3A:
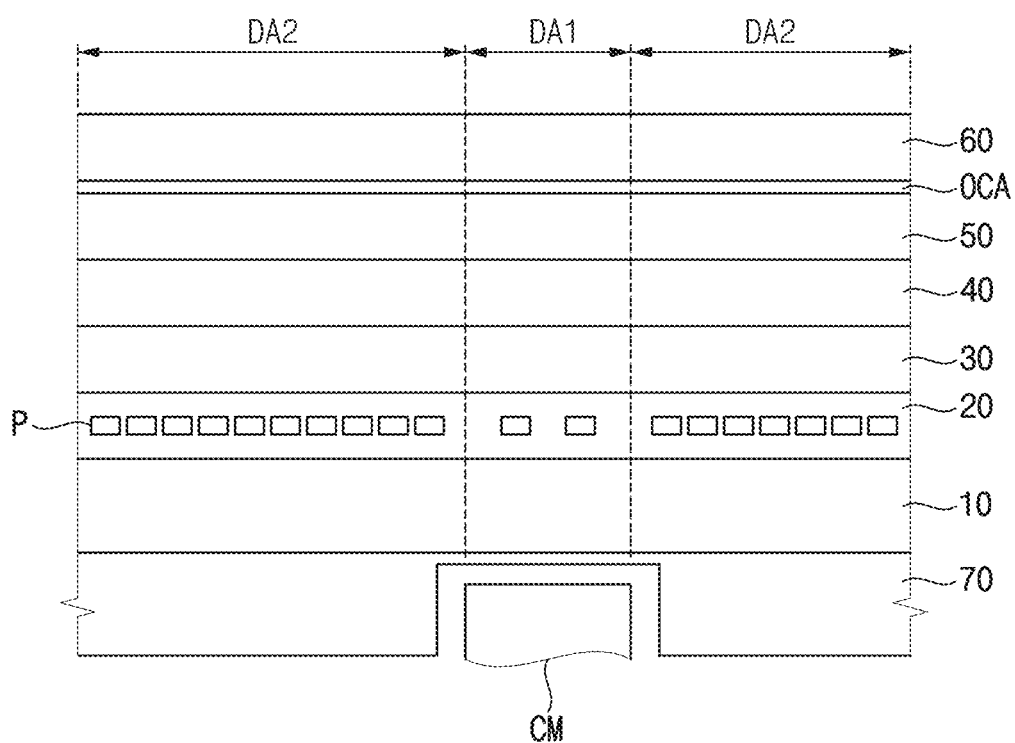
FIGS. 3A and 3B are diagrams for illustrating pixel structure of a first display region and a second display region in FIG. 2.
Figure 3B:
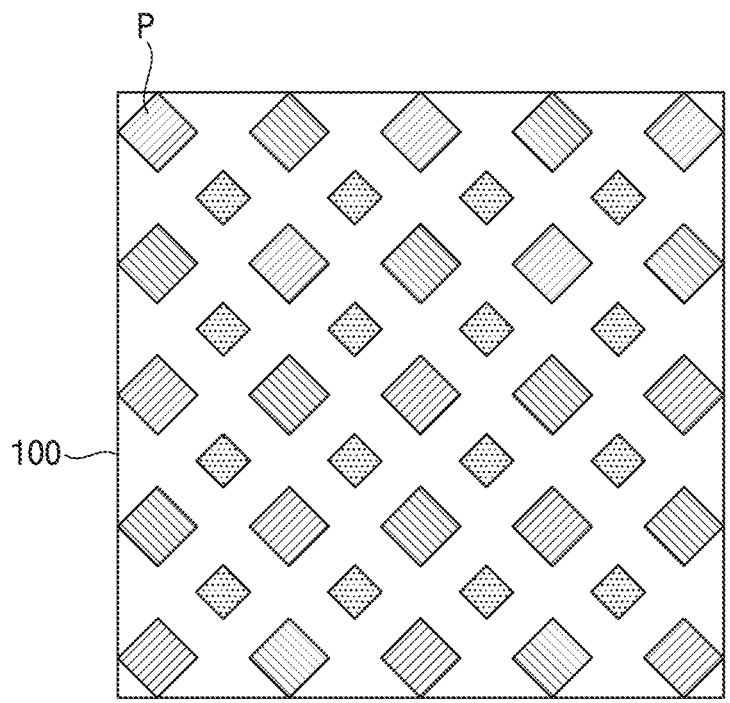

FIG. 2 is a diagram for illustrating a display panel 100 in FIG. 1. FIGS. 3A and 3B are diagrams for illustrating pixel structure of a first display region DA1 and a second display region DA2 in FIG. 2.

Referring to FIGS. 1 to 3B, an embodiment of the display panel 100 may include a first display panel DA1 and a second display panel DA2.

The first display region DA1 may be a under panel camera (UPC) region, and the second display region DA2 may be a normal display area excluding the first display region DA1. An electronic module CM may be disposed below the first display region DA1. The first display region DA1 may include both a transmitting portion through which light passes and a display portion which displays an image, and the second display region DA2 may include only the display portion without the transmitting portion. The first display region DA1 may have a first transmittance, and the second display region DA2 may have a second transmittance. The first transmittance may be higher than the second transmittance. Therefore, a signal may be easily transferred to the electronic module CM through the first display region DA1. In an embodiment, a part of the first display region DA1 may be omitted to increase the first transmittance. In an embodiment, for example, some of the pixels P disposed in the first display region DA1 may be removed. Density of the pixels P of the first display region DA1 may be different from density of the pixels P of the second display region DA2.

In an embodiment, the electronic module CM may be a camera module. Alternatively, the electronic module CM may be a sensor module.

The electronic module CM may be an electronic element using light or sound. In an embodiment, for example, the electronic element may be a sensor which receives and uses light such as an infrared sensor, a camera which receives light and takes an image, a sensor which outputs and detects light or sound to measure distance or recognizes a fingerprint. The electronic element may be a small lamp which outputs light or a speaker which outputs sound. In an embodiment where the electronic element uses light, light of various wavelength bands such as visible light, infrared light, and ultraviolet light may be used.

In an embodiment, for example, the electronic module CM may include a plurality of sensors for sensing a user. In an embodiment, for example, the electronic module CM may perform a function of a proximity sensor for determining the user's proximity, a gesture sensor for determining the user's gesture, a fingerprint recognition sensor for recognizing the user's fingerprint, an iris recognition sensor for recognizing the user's iris, or a face recognition sensor for recognizing the user's face.

In an embodiment, as shown in FIG. 3A, the first display region DA1 may include a substrate 10, a display layer 20 disposed on the substrate 10, an encapsulation layer 30 disposed on the display layer 20, and an input sensing layer 40 disposed on the encapsulation layer 30, an optical function layer 50 disposed on the input sensing layer 40, an adhesive layer OCA disposed on the optical function layer 50, and an window 60 disposed on the adhesive layer OCA.

In an embodiment, as shown in FIG. 3B, the display layer 20 may include the pixels P, and the density of the pixels P of the first display region DA1 may be different from the density of the pixels P of the second display region DA2.

A lower protective film 70 may be disposed below the substrate 10. In an embodiment, the lower protective film 70 may include a recess corresponding to the electronic module CM. Alternatively, the lower protective film 70 may not include the recess corresponding to the electronic module CM.

Figure 4:
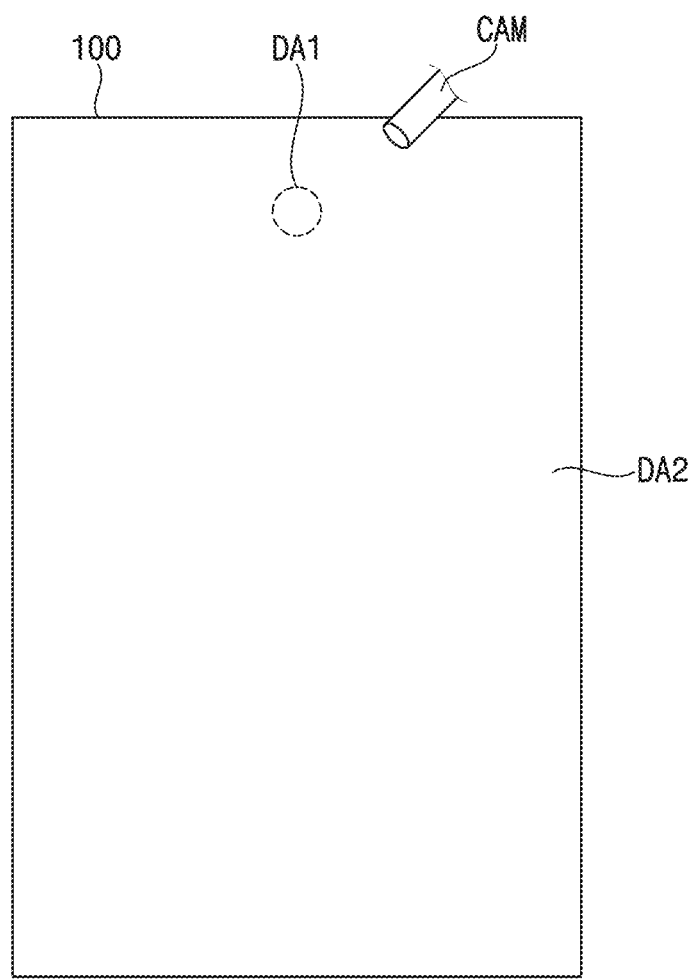
FIG. 4 is a diagram for illustrating an operation of extracting an evaluation image of a first display region and second display region.
Figure 5:
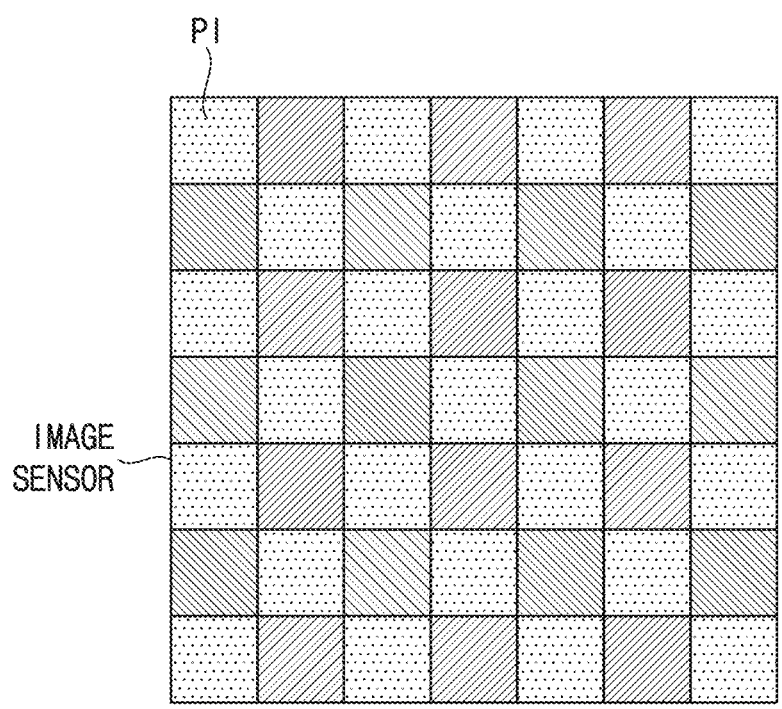
FIG. 5 is a diagram for illustrating an image sensor of an imaging device in FIG. 4.

FIG. 4 is a diagram for illustrating an operation of extracting an evaluation image of a first display region DA1 and second display region DA2. FIG. 5 is a diagram for illustrating an image sensor of an imaging device CAM in FIG. 4.

Referring to FIGS. 1 to 5, in an embodiment, the image displayed on the first display region DA1 of the display panel 100 may be captured by the imaging device CAM to extract (or obtain) an evaluation image. The image captured by the imaging device CAM may be referred to as the evaluation image.

The imaging device CAM may include an image sensor. The image sensor may convert light reflected from an object into an electrical signal. In an embodiment, the object may be the display panel 100. In an embodiment, for example, the image sensor may be a charge coupled device (CCD) image sensor. In an embodiment, for example, the image sensor may be a complementary metal oxide semiconductor (CMOS) image sensor. The image sensor may include imaging pixels PI which receives the light. The image sensor may measure intensity of the light and generate the electrical signal based on the measured intensity of the light. When the imaging pixels PI of the image sensor capture the light without noise, the image captured by the imaging device CAM may be clear.

Figure 6:
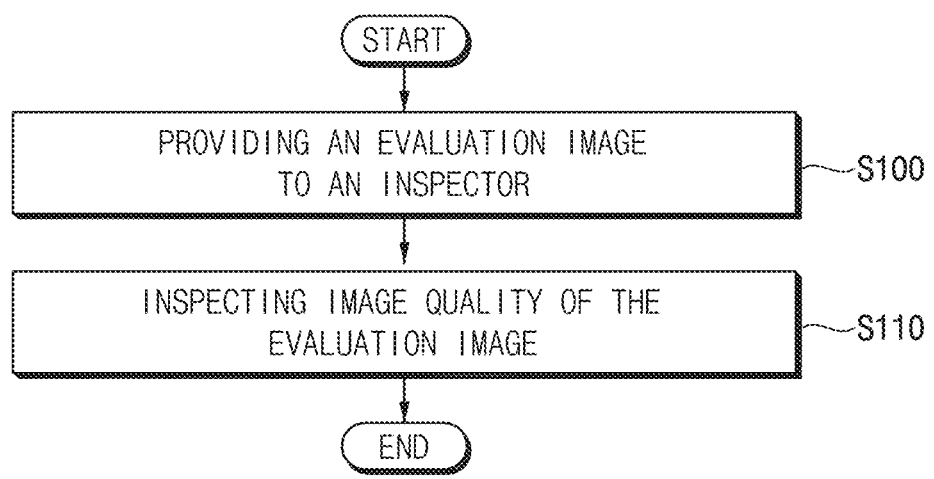
FIG. 6 is a flowchart for illustrating a conventional method of inspecting image quality of a captured evaluation image.

FIG. 6 is a flowchart for illustrating a conventional method of inspecting image quality of a captured evaluation image.

Referring to FIGS. 1 to 6, a conventional method of inspecting image quality of the captured evaluation image may include providing the captured evaluation image to an inspector (S100), and inspecting the image quality of the evaluation image (S110).

The imaging device CAM may capture the image displayed on the display panel 100. The imaging device CAM may generate the evaluation image based on the image displayed on the display panel 100.

The inspector may inspect the image quality of the captured evaluation image. Specifically, the inspector may inspect dots, stains, luminance, color, or the like of the evaluation image whose the image quality is partially compensated.

Figure 7:
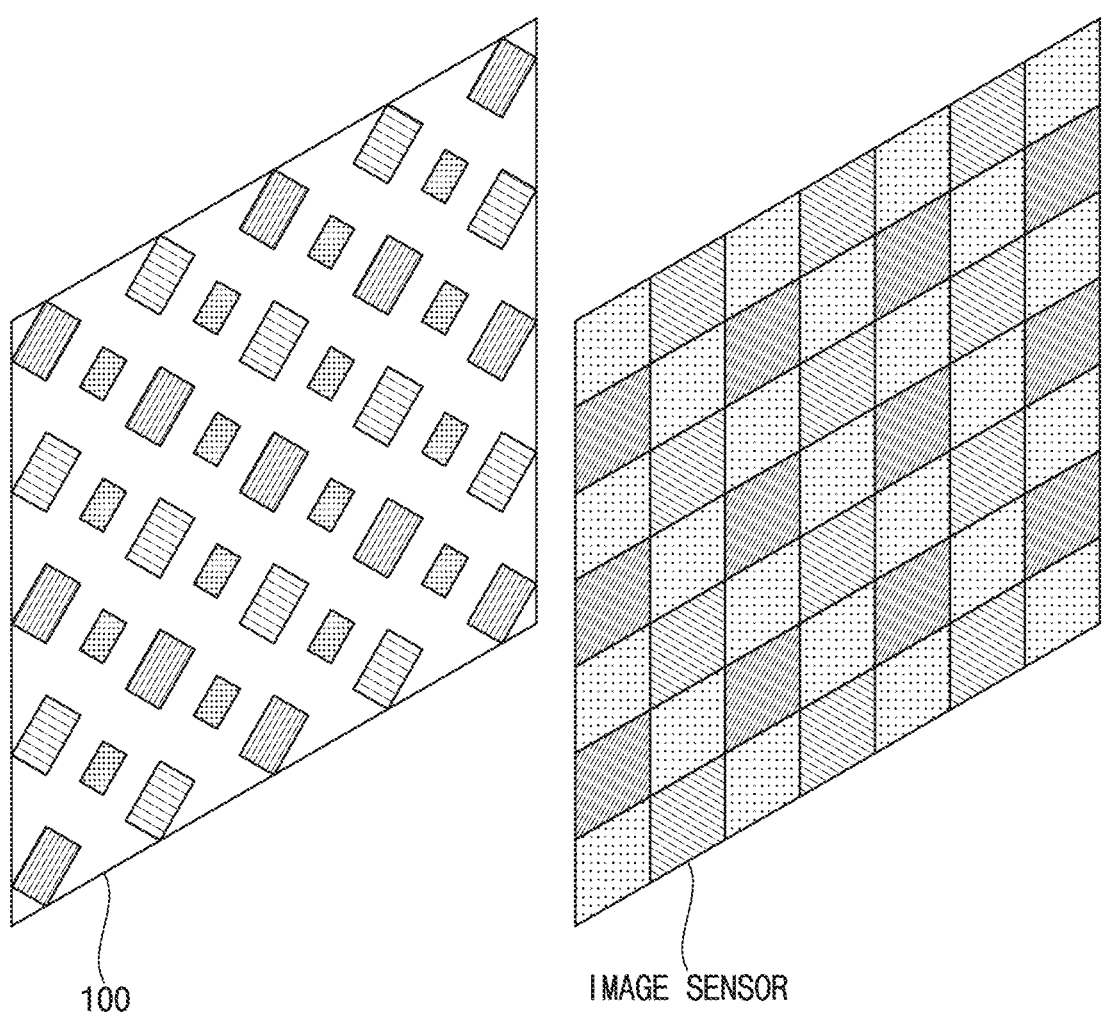
FIG. 7 is a conceptual diagram for illustrating a moire.
Figure 8A:
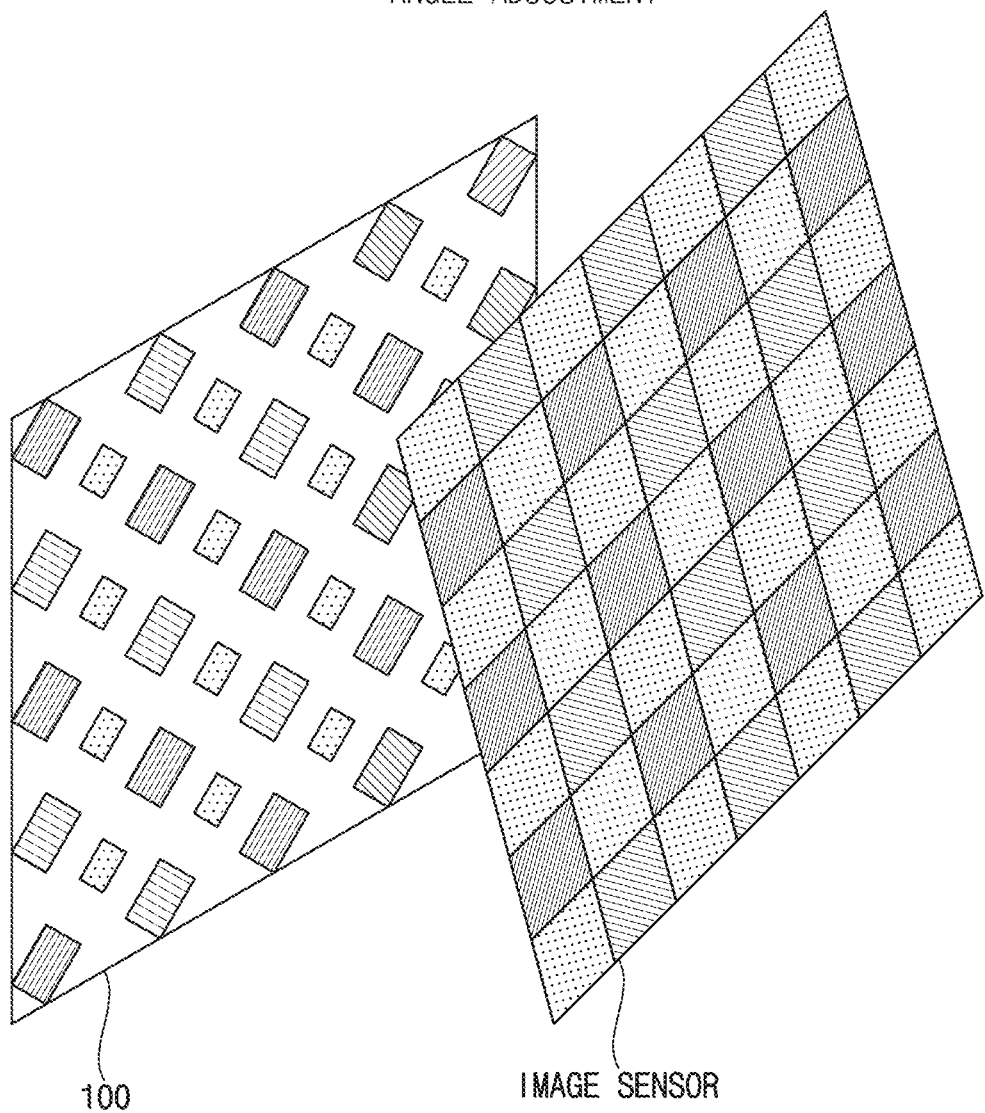
FIGS. 8A and 8B are diagrams for illustrating an arrangement of a display panel and an arrangement of an image sensor in FIG. 6.
Figure 8B:
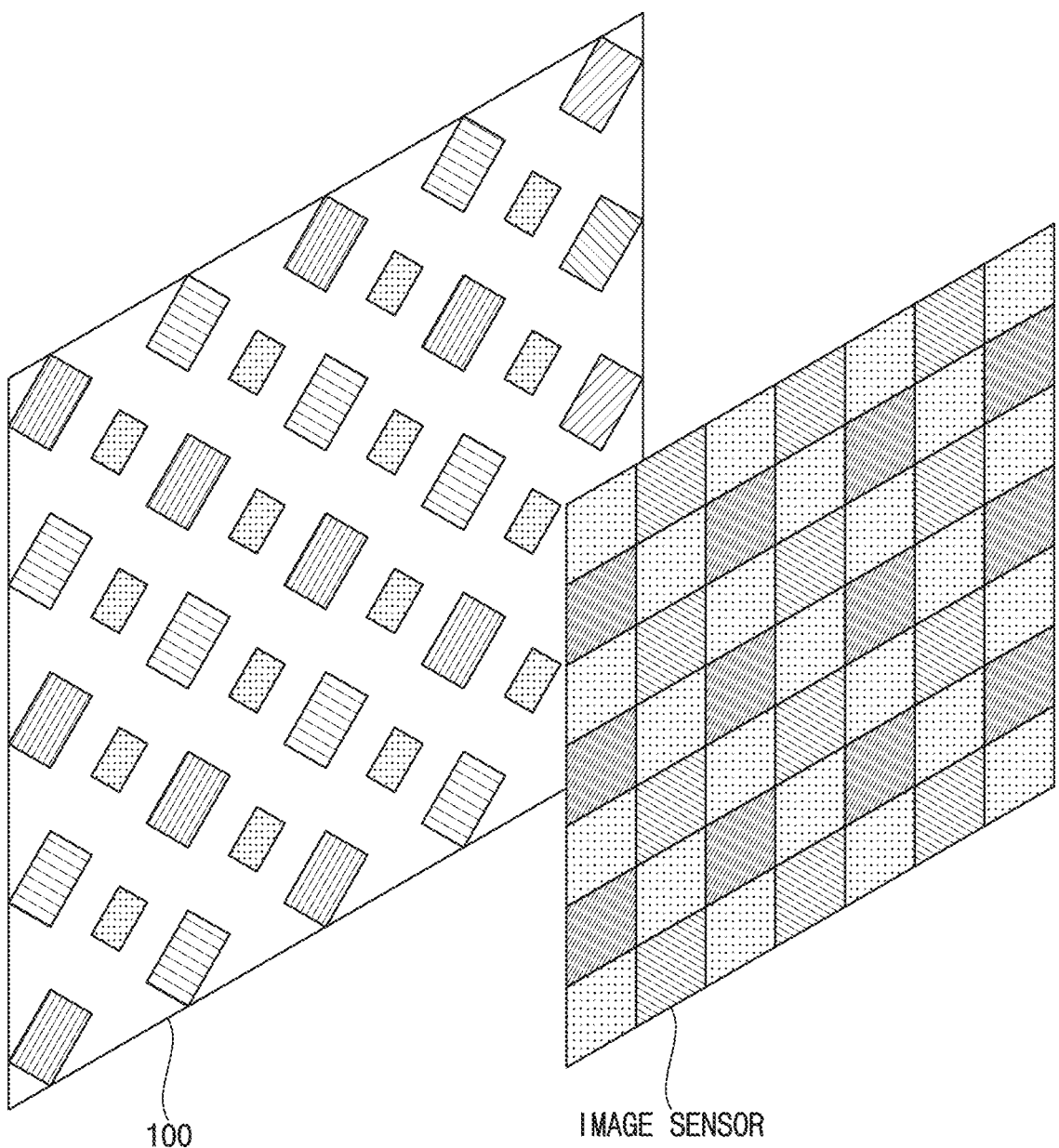

FIG. 7 is a conceptual diagram for illustrating a moire. FIGS. 8A and 8B are diagrams for illustrating an arrangement of a display panel 100 and an arrangement of an image sensor in FIG. 6.

Referring to FIGS. 1 to 8B, the image displayed on the display panel 100 may be different from the evaluation image captured by the image sensor of the imaging device CAM. Since the image sensor includes the imaging pixels PI arranged in a lattice structure, high frequency components may cause interference when an object having a specific pattern is captured. The pattern due to the interference may be referred to as a moire. The display panel 100 may include the pixels P arranged in the lattice structure and the image sensor may include the imaging pixels PI arranged in the lattice structure. The lattice structure of the display panel 100 and the lattice structure of the image sensor may not match each other. Therefore, when the display panel 100 may be captured by the image sensor, as shown in FIG. 7, the moire may be generated. A moire image which includes the moire may be generated based on the arrangement of pixels P included in the display panel 100 and the arrangement of the imaging pixels PI included in the image sensor. In particular, the moire image may easily be generated in the first display region DA1 including the UPC region. In this case, since the density of the pixels P of the first display region DA1 is different from the density of the pixels P of the second display region DA2, the moire image may easily be generated in the first display area DA1.

For example, as shown in FIG. 8A, the moire image may be generated based on an angle between the display panel 100 and the image sensor. Noise generated from the imaging pixels PI of the image sensor may change based on the angle between the display panel 100 and the image sensor.

For example, as shown in FIG. 8B, the moire image may be generated based on magnification of the display panel 100 and the image sensor. The noise generated from the imaging pixels PI of the image sensor may change based on the magnification of the display panel 100 and the image sensor. Magnification of the display panel 100 may be determined by adjusting the number of pixels P included in a same region of the display panel 100. The magnification of the display panel 100 may be determined by adjusting a region of the display panel 100 including a same number of pixels P. Magnification of the image sensor may be determined by adjusting the number of imaging pixels PI included in the same region of the image sensor. The magnification of the image sensor may be determined by adjusting a region of the image sensor including the same number of imaging pixels.

In a case where the inspector inspects the image quality of the evaluation image including the moire, since the evaluation image is different from the image displayed on the display panel 100, the inspection of the image quality may be inaccurate.

Accordingly, in this case, moire compensation which removes the moire included in the evaluation image may be desired to be performed.

Figure 9:
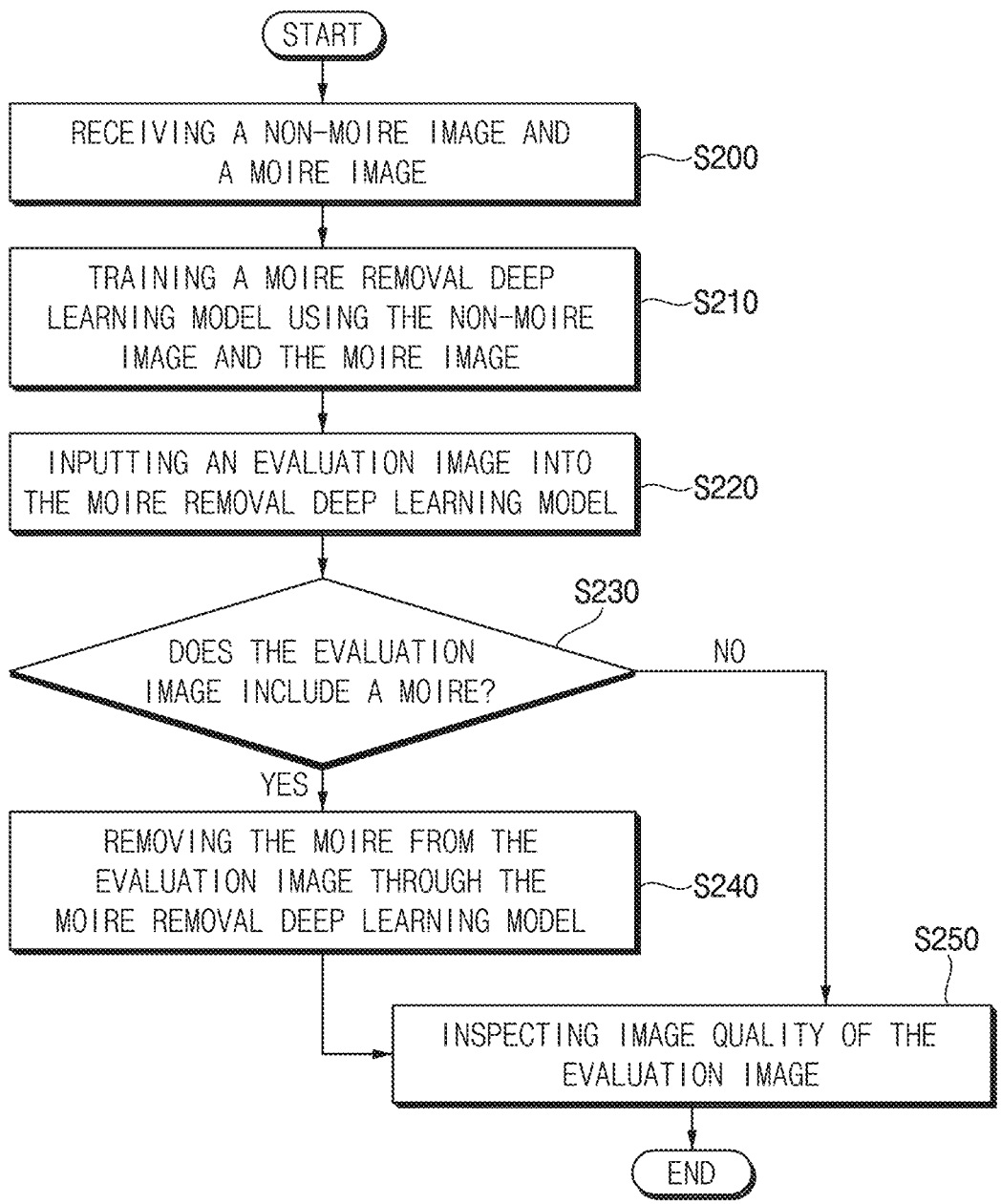
FIG. 9 is a flowchart for illustrating a method of inspecting image quality for performing a moire removal function.
Figure 10:
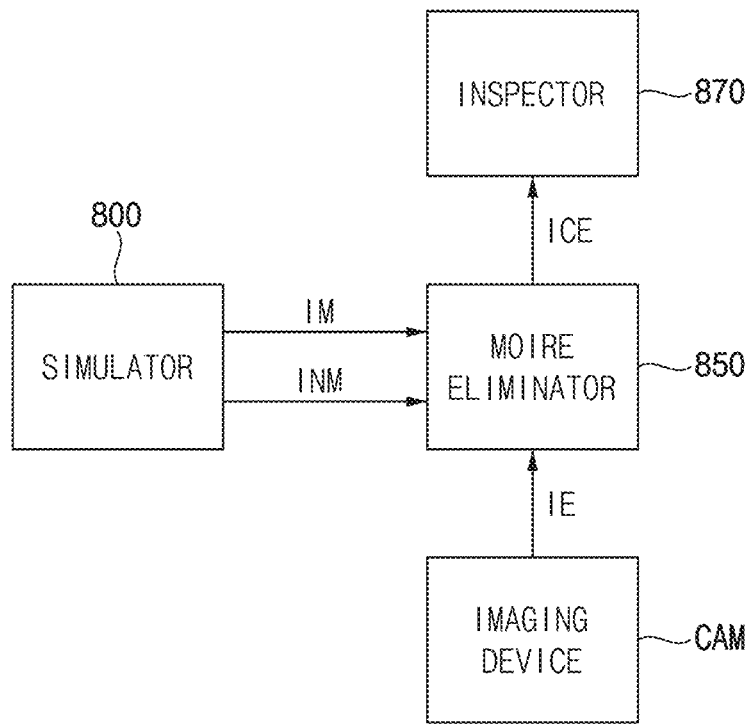
FIG. 10 is a block diagram for illustrating a simulator, an imaging device, a moire eliminator, and an inspector.
Figure 11:
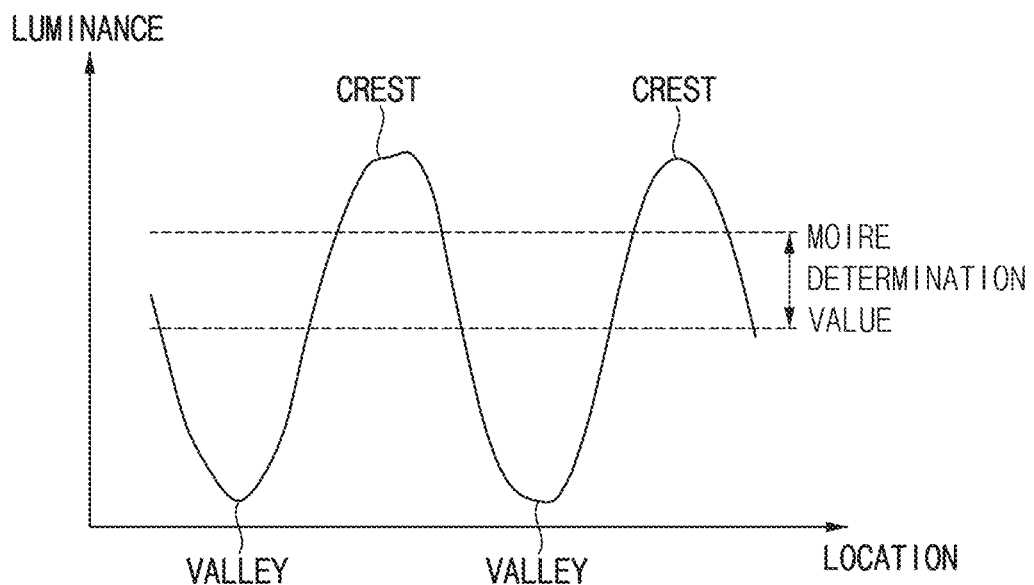
FIG. 11 is a conceptual diagram for determining a non-moire image and a moire image.
Figure 12:
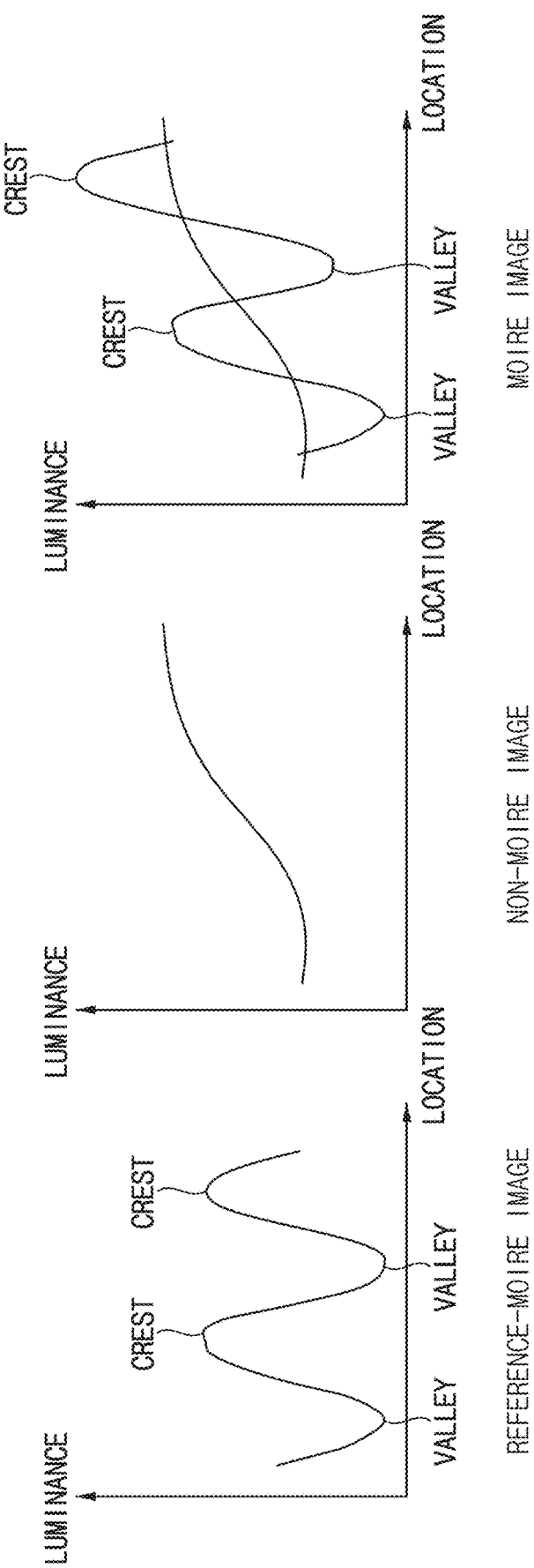
FIG. 12 is a conceptual diagram for illustrating an operation of generating a non-moire image and a moire image by a simulator in FIG. 9.
Figure 13:
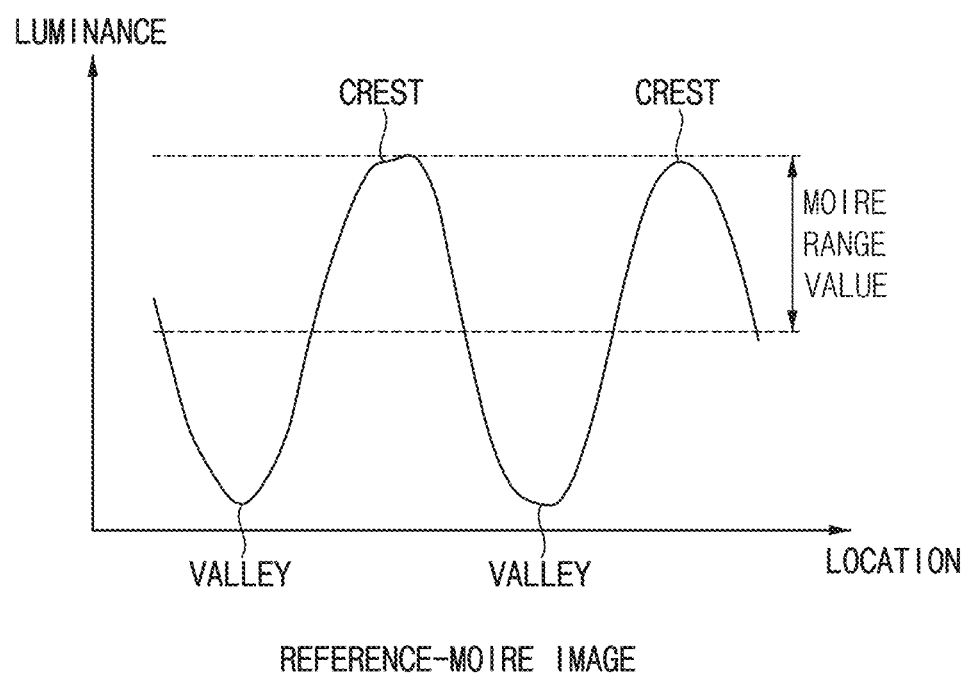
FIG. 13 is a conceptual diagram for illustrating a moire range value of a moire image.

FIG. 9 is a flowchart for illustrating a method of inspecting image quality for performing a moire removal function. FIG. 10 is a block diagram for illustrating a simulator 800, an imaging device CAM, a moire eliminator (or moire remover) 850, and an inspector 870. FIG. 11 is a conceptual diagram for determining a non-moire image INM and a moire image IM. FIG. 12 is a conceptual diagram for illustrating an operation of generating a non-moire image INM and a moire image IM by a simulator 800 in FIG. 9. FIG. 13 is a conceptual diagram for illustrating a moire range value of a moire image IM.

Referring to FIGS. 1 to 13, an embodiment of a method of inspecting the image quality for removing the moire may include receiving a non-moire image INM generated by a simulator 800 and a moire image IM generated by the simulator 800 based on the non-moire image INM (S200), training a moire removal deep learning model for converting the moire image IM into the non-moire image INM from which the moire is removed using the non-moire image INM and the moire image IM (S210), inputting the evaluation image IE generated by capturing the image displayed on the first display region DA1 by the imaging device CAM into the moire removal deep learning model (S220), removing the moire from the evaluation image through the moire removal deep learning model when the evaluation image IE includes the moire (S240), and inspecting the image quality of the evaluation image IE (S250).

An image quality inspection system may include the imaging device CAM, the simulator 800, a moire eliminator 850, and the inspector 870. In an embodiment, the moire eliminator 850 may be formed separately from the display device 90. Alternatively, the moire eliminator 850 may be included in the display device 90.

The simulator 800 may generate the non-moire image INM, and may generate the moire image IM based on the non-moire image INM. The simulator 800 may generate a reference-moire image based on the arrangement of the pixels P included in the display panel 100 and the arrangement of the imaging pixels PI included in the image sensor. The simulator 800 may generate the moire image IM by overlapping the reference-moire image on the non-moire image INM. The reference-moire image may be an image overlapped on (or compared with) the non-moire image INM to generate the moire image IM from the non-moire image INM.

The simulator 800 may generate the moire image IM based on at least one selected from the angle of the display panel 100 and the angle of the image sensor. The simulator 800 may generate the moire image IM based on at least one selected from the magnification of the display panel 100 and the magnification of the image sensor.

The non-moire image INM may be an image which does not include the moire, and the moire image IM may be an image which includes the moire. Whether an image is the moire image IM or the non-moire image INM may be determined based on luminance of the evaluation image IE. In an embodiment, for example, when difference between an average value of entire luminance of the first display region DA1 and luminance of a luminance valley of the first display area DA1 is greater than a moire determination value, the image may be determined to be the moire image IM. In an embodiment, for example, when difference between the average value of the entire luminance of the first display region DA1 and luminance of a luminance crest of the first display area DA1 is greater than the moire determination value, the image may be determined to be the moire image IM. In an embodiment, for example, when the difference between the average value of the entire luminance of the first display region DA1 and the luminance of the luminance valley of the first display area DA1 is less than or equal to the moire determination value, the image may be determined as the non-moire image INM. In an embodiment, for example, when the difference between the average value of the entire luminance of the first display region DA1 and the luminance of the luminance crest of the first display area DA1 is less than or equal to the moire determination value, the image may be determined as the non-moire image INM.

A difference between an average value of luminance of the reference-moire image and luminance of a luminance valley of the reference-moire image may be less than or equal to a moire range value. A difference between the average value of the luminance of the reference-moire image and luminance of a luminance crest of the reference-moire image may be less than or equal to the moire range value.

Generally, a difference in luminance at each point of the moire image IM may be within a certain range. In an embodiment, for example, when the average value of the luminance of the reference-moire image is 500 nit, the difference between the average value of the luminance of the reference-moire image and the luminance of the luminance valley of the reference-moire image may be up to 50 nits, that is, 10%. In an embodiment, for example, when the average value of the luminance of the reference-moire image is 500 nit, the difference between the average value of the luminance of the reference-moire image and the luminance of the luminance crest of the reference-moire image may be up to 50 nits, that is, 10%. Therefore, the simulator 800 may generate the non-moire image INM and the moire image IM in a range where the difference between the average value of the luminance of the reference-moire image and the luminance of the luminance valley or crest of the reference-moire image is in the moire range value to enhance reliability of the method of inspecting the image quality. Accordingly the moire determination value is a value for determining whether the image includes the moire, and the moire range value is a range value set for generating the moire image IM based on the non-moire image INM and the reference-moire image.

The moire eliminator 850 may receive the non-moire image INM which is generated by the simulator 800 and the moire image IM which is generated based on the non-moire image INM by the simulator 800. The moire eliminator 850 may train the moire removal deep learning model which converts the moire image IM into the non-moire image INM from which the moire is removed based on the non-moire image INM and the moire image IM.

The moire eliminator 850 may train the moire removal deep learning model through supervised learning of converting the moire image IM into the non-moire image INM by removing the reference-moire image from the moire image IM. In an embodiment, in order for the moire eliminator 850 to perform a moire removal function, the moire eliminator 850 may train the moire removal deep learning model using a deep learning algorithm.

Deep learning refers to a technology in which electronic devices are trained by combining and analyzing data to form rules on their own. The deep learning algorithm may be a neural network. The neural network may be a set of algorithms which train a method of recognizing an object from a predetermined image input to a neural network based on artificial intelligence (AI). In an embodiment, for example, the neural network may train a method of recognizing the object from the image based on the supervised learning using the predetermined image as an input. In an embodiment, for example, the neural network may train a method of recognizing the object from the image based on unsupervised learning which discovers a pattern for recognizing the object from the image by self-learning type of data without any special guidance. In an embodiment, for example, the neural network may train a method of recognizing the object from the image using reinforcement learning which uses feedback about whether a result of recognizing the object through learning is correct.

In addition, the neural network may perform calculations for reasoning and prediction according to AI technology. Specifically, the neural network may be a deep neural network (DNN) which performs an operation through a plurality of layers. The neural network may be classified as the DNN when the number of layers which perform calculations is multiple (that is, when depth of the neural network which performs calculations increases). Also, DNN calculations may include convolutional neural network (CNN) calculations or the like. The convolutional neural network may include a U-NET network or the like. Here, U-NET is a U-shaped encoder-decoder network architecture, which consists of four encoder blocks and four decoder blocks that are connected via a bridge. That is, the moire eliminator 850 may implement a data recognition model for recognizing the object through the illustrated neural network and train the implemented data recognition model using training data. In addition, by using the trained data recognition model, an image which is input data may be analyzed or classified.

In such an embodiment, the deep learning algorithm may be the U-NET network, and for optimization of the invention, the layers of the U-NET network may be reduced. However, this is only an example and is not limited thereto.

The imaging device CAM may capture the evaluation image IE from the first display region DA1 of the display panel 100. The imaging device CAM may provide the captured evaluation image IE to the moire eliminator 850. When the evaluation image IE includes the moire, the moire eliminator 850 may remove the moire included in the evaluation image IE through the moire removal deep learning model. The moire eliminator 850 may provide the evaluation image ICE from which the moire is removed to the inspector 870.

An embodiment of the method of inspecting the image quality may include inspecting the quality of the evaluation image ICE when the evaluation image IE does not include the moire (S250).

The inspector 870 may inspect the quality of the evaluation image ICE. In an embodiment, for example, the inspector 870 may inspect dots, stains, luminance, and color of the evaluation image ICE.

The inspector 870 may generate the compensation data CMPD having the compensation value based on the evaluation image ICE from which the moire is removed.

As such, the non-moire image INM and the moire image IM based on the non-moire image INM may be generated by the simulator 800, the moire removal deep learning model which converts the moire image IM into the non-moire image INM from which the moire is removed may be trained by using images generated by the simulator 800. Accordingly, a time spent for generating the non-moire image INM and the moire image IM which are used for training the moire removal deep learning model may be reduced, and the moire of the evaluation image IE may be removed, so that the reliability of the inspection may be enhanced.

Figure 14:
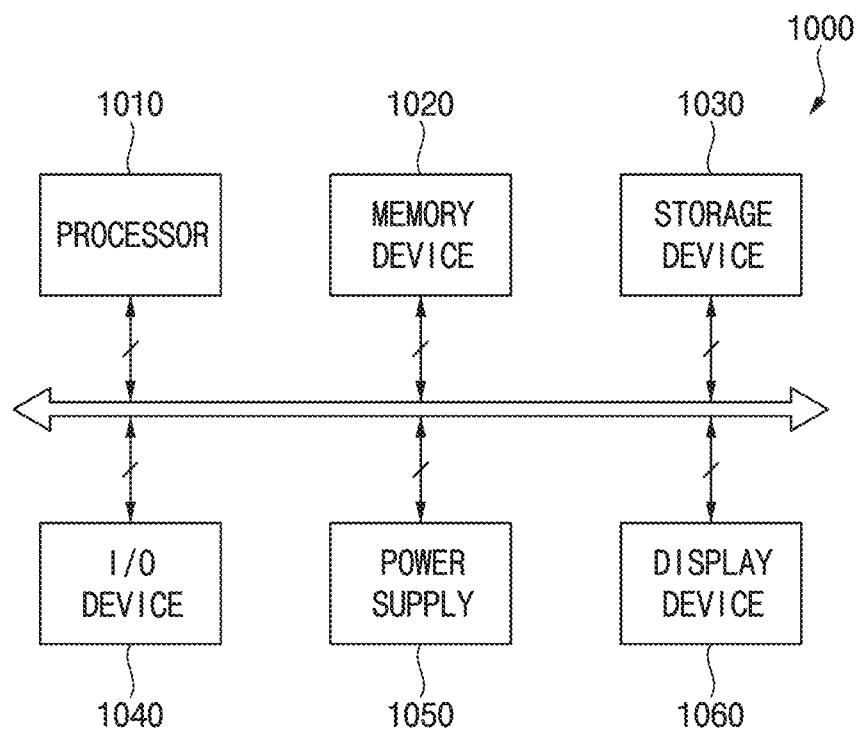
FIG. 14 is a block diagram for illustrating an electronic device.
Figure 15:
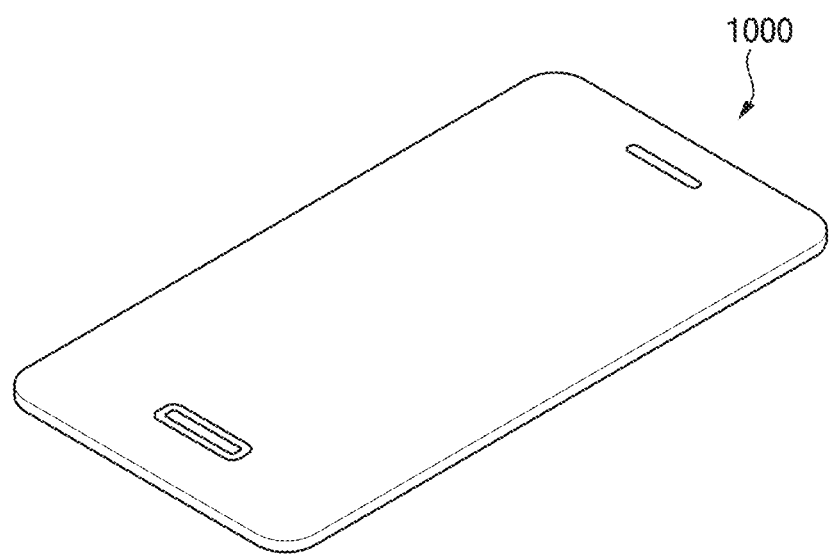
FIG. 15 is a diagram for illustrating an embodiment in which an electronic device in FIG. 14 is implemented as a smart phone.

FIG. 14 is a block diagram for illustrating an electronic device. FIG. 15 is a diagram for illustrating an embodiment in which an electronic device 1000 in FIG. 14 is implemented as a smart phone.

Referring to FIGS. 14 and 15, an embodiment of an electronic device 1000 may include a processor 1010, a memory device 1020, a storage device 1030, an input/output (I/O) device 1040, a power supply 1050, and a display device 1060. The display device 1060 may be a display device 90 in FIG. 1. In addition, the electronic device 1000 may further include a plurality of ports for communicating with a video card, a sound card, a memory card, a universal serial bus (USB) device, other electronic device, or the like.

In an embodiment, as illustrated in FIG. 15, the electronic device 1000 may be implemented as a smart phone. However, the electronic device 1000 is not limited thereto. In an embodiment, for example, the electronic device 1000 may be implemented as a cellular phone, a video phone, a smart pad, a smart watch, a tablet personal computer (PC), a car navigation system, a computer monitor, a laptop, a head mounted display (HMD) device, or the like.

The processor 1010 may perform various computing functions. The processor 1010 may be a micro processor, a central processing unit (CPU), an application processor (AP), or the like. The processor 1010 may be coupled to other components via an address bus, a control bus, a data bus, or the like. Further, the processor 1010 may be coupled to an extended bus such as a peripheral component interconnection (PCI) bus.

The memory device 1020 may store data for operations of the electronic device 1000. In an embodiment, for example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like and/or at least one volatile memory device such as a dynamic random access memory (DRAM) device, a static random access memory (SRAM) device, a mobile DRAM device, or the like.

The storage device 1030 may include a solid state drive (SSD) device, a hard disk drive (HDD) device, a CD-ROM device, or the like.

The I/O device 1040 may include an input device such as a keyboard, a keypad, a mouse device, a touch-pad, a touch-screen, or the like, and an output device such as a printer, a speaker, or the like. In some embodiments, the I/O device 1040 may include the display device 1060.

The power supply 1050 may provide power for operations of the electronic device 1000.

The display device 1060 may be connected to other components through buses or other communication links.

Embodiments of the invention may be applied to any display device and any electronic device including a display panel, for example, a mobile phone, a smart phone, a tablet computer, a digital television (TV), a three-dimensional (3D) TV, a PC, a home appliance, a laptop computer, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A method of inspecting image quality, the method comprising:
    receiving a non-moire image generated by a simulator and a moire image generated by the simulator based on the non-moire image;
    training a moire removal deep learning model for converting the moire image into the non-moire image, from which a moire is removed, using the non-moire image and the moire image;
    inputting an evaluation image generated by capturing an image displayed on a first display region by an imaging device into the moire removal deep learning model; and
    removing the moire from the evaluation image through the moire removal deep learning model when the evaluation image includes the moire.

2. The method of claim 1, wherein the simulator generates the moire image based on an arrangement of first pixels included in a display panel and an arrangement of second pixels included in an image sensor of the imaging device.

3. The method of claim 2, wherein the simulator generates the moire image by adjusting at least one selected from an angle of the display panel and an angle of the image sensor.

4. The method of claim 2, wherein the simulator generates the moire image by adjusting at least one selected from a magnification of the display panel and a magnification of the image sensor.

5. The method of claim 1, wherein the moire image is generated by overlapping a reference-moire image on the non-moire image.

6. The method of claim 5, wherein a difference between a luminance of the moire image and a luminance of the non-moire image is less than or equal to a moire range value.

7. The method of claim 6, wherein the moire removal deep learning model is trained through supervised learning of converting the moire image into the non-moire image by dividing the moire image and the reference-moire image.

8. The method of claim 1, wherein
    the first display region includes a display portion and a transmitting portion, and
    the first display region overlaps a camera module.

9. The method of claim 1, wherein the moire removal deep learning model is a U-NET network.

10. An image quality inspection system comprising:
    an imaging device which captures an evaluation image displayed on a first display region;
    a simulator which generates a non-moire image and generates a moire image based on the non-moire image;
    a moire eliminator which trains a moire removal deep learning model for converting the moire image into the non-moire image, from which a moire is removed, using the non-moire image and the moire image, and removes the moire from the evaluation image through the moire removal deep learning model when the evaluation image includes the moire; and
    an inspector which generates compensation data based on the evaluation image, from which the moire is removed.

11. The image quality inspection system of claim 10, wherein the simulator generates the moire image based on an arrangement of first pixels included in a display panel and an arrangement of second pixels included in an image sensor of the imaging device.

12. The image quality inspection system of claim 11, wherein the simulator generates the moire image by adjusting at least one selected from an angle of the display panel and an angle of the image sensor.

13. The image quality inspection system of claim 11, wherein the simulator generates the moire image by adjusting at least one selected from a magnification of the display panel and a magnification of the image sensor.

14. The image quality inspection system of claim 10, wherein the moire image is generated by overlapping a reference-moire image on the non-moire image.

15. The image quality inspection system of claim 14, wherein a difference between a luminance of the moire image and a luminance of the non-moire image is less than or equal to a moire range value.

16. The image quality inspection system of claim 15, wherein the moire eliminator trains the moire removal deep learning model through supervised learning of converting the moire image into the non-moire image by dividing the moire image and the reference-moire image.

17. The image quality inspection system of claim 10, wherein
the first display region includes a display portion and a transmitting portion, and
the first display region overlaps a camera module.

18. The image quality inspection system of claim 10, wherein the moire removal deep learning model is a U-NET network.

19. A display device comprising:
a display panel including first pixels;
a gate driver which provides a gate signal to each of the first pixels;
a compensation data memory which stores compensation data;
a driving controller which compensates for input image data to generate compensated image data based on the compensation data; and
a data driver which provides a data voltage based on the compensated image data to each of the first pixels,
wherein the compensation data includes a compensation value determined based on a moire removal deep learning model trained using a non-moire image generated by a simulator and a moire image generated by the simulator based on the non-moire image.

20. The display device of claim 19, wherein the simulator generates the moire image based on an arrangement of the first pixels included in the display panel and an arrangement of second pixels included in an image sensor of an imaging device.

* * * * *